United States Patent
Colletti et al.

(10) Patent No.: US 10,190,947 B2
(45) Date of Patent: Jan. 29, 2019

(54) VISUAL CREEP INSPECTION OF ROTATING COMPONENTS

(71) Applicant: General Electric Company, Schenectady, NY (US)

(72) Inventors: Andrew Joseph Colletti, Greenville, SC (US); Bryan Joseph Germann, Greenville, SC (US); Gregory Lee Hovis, Martinez, GA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 208 days.

(21) Appl. No.: 15/366,714

(22) Filed: Dec. 1, 2016

(65) Prior Publication Data

US 2018/0156694 A1 Jun. 7, 2018

(51) Int. Cl.
```
G01M 5/00     (2006.01)
F01D 17/02    (2006.01)
G01M 11/08    (2006.01)
G01M 15/14    (2006.01)
```
(52) U.S. Cl.
CPC ............ *G01M 15/14* (2013.01); *F01D 17/02* (2013.01); *G01M 5/0025* (2013.01); *G01M 5/0091* (2013.01); *G01M 11/081* (2013.01)

(58) Field of Classification Search
CPC ..... G01L 5/161; G01M 15/14; G01M 11/081; G01M 5/0025; G01M 5/0091; G01M 11/08; G01M 15/02; G01M 5/005; F01D 17/02

See application file for complete search history.

(56) References Cited

U.S. PATENT DOCUMENTS

| | | | | |
|---|---|---|---|---|
| 4,939,368 A | * | 7/1990 | Brown | G01B 11/165 250/231.1 |
| 5,193,628 A | * | 3/1993 | Hill, III | E21B 47/0006 175/45 |
| 5,474,813 A | * | 12/1995 | Walker | G01H 1/003 427/510 |

(Continued)

FOREIGN PATENT DOCUMENTS

| | | |
|---|---|---|
| EP | 2 778 645 A1 | 9/2014 |
| JP | S61-162730 A | 7/1986 |

OTHER PUBLICATIONS

Partial Search Report and Written Opinion issued in connection with corresponding EP Application No. 17203788.9 dated Apr. 26, 2018.

*Primary Examiner* — Que Tan Le
*Assistant Examiner* — Jennifer D Bennett
(74) *Attorney, Agent, or Firm* — Ernest G. Cusick; Hoffman Warnick LLC

(57) ABSTRACT

This disclosure provides systems, components, and methods for visual creep inspection of rotating components, such as those in a gas turbine. A component is provided with an external surface and an axis of rotation. The external surface has a circumference and a plurality of three dimensional reference marks forming a reference pattern along the circumference. An optical data capture device generates a data signal based on the plurality of three dimensional reference marks. A data analysis system processes the data signal to calculate a deviation in spacing of the reference pattern along the circumference and determines a strain or creep measurement.

12 Claims, 4 Drawing Sheets

(56) References Cited

U.S. PATENT DOCUMENTS

| | | | | | |
|---|---|---|---|---|---|
| 8,042,412 | B2* | 10/2011 | Xia | ................. | G01H 9/004 |
| | | | | | 73/650 |
| 8,818,078 | B2 | 8/2014 | Telfer et al. | | |
| 2009/0177416 | A1* | 7/2009 | Nilsagard | ............. | G01D 5/347 |
| | | | | | 702/41 |
| 2010/0212632 | A1* | 8/2010 | Javaherian | ............. | F02D 35/02 |
| | | | | | 123/406.23 |
| 2011/0106459 | A1* | 5/2011 | Christ, Jr. | ............ | G01N 21/892 |
| | | | | | 702/42 |
| 2012/0293647 | A1* | 11/2012 | Singh | ................ | F01D 17/02 |
| | | | | | 348/82 |
| 2015/0107368 | A1* | 4/2015 | Harding | ................. | G01N 3/08 |
| | | | | | 73/822 |
| 2016/0252417 | A1 | 9/2016 | Hovis et al. | | |

* cited by examiner

VISUAL CREEP INSPECTION OF ROTATING COMPONENTS

BACKGROUND

The disclosure relates to systems and methods for optically measuring creep and, more specifically, measuring creep of rotating components.

Gas turbines typically include a compressor section, a combustion section, and a turbine section. The compressor section pressurizes air flowing into the turbine. The combustion section receives the pressurized air, mixes it with fuel, and combusts the mixture. The turbine section receives the combustion flow from the combustion section to drive the turbine and generate power. Various components along the flow path, particularly in the compressor and turbine sections, rotate around one or more central axis during operation. These rotating components are subject to wear, swell, shrink, and migration during use. Rotating components are subject to creep due to the high temperatures and stresses during operation and may be permanently deformed. Significant deformation can lead to loss of efficiency and mechanical failure in some systems. Rotating components may be periodically or occasionally inspected to assure continued operation and/or schedule maintenance or end of service.

Conventional methods of measuring gas turbine components for creep have required system tear down and removal of such components in order to precisely measure strain within the component. For high availability systems, this can be problematic and create a significant loss in productivity.

Visual and, more specifically, digital image based measurement methods have been employed for measuring creep in some components, though often with the requirement of a precision fixture to enable image correlation that requires removal of the component from the gas turbine. Removal of rotating components may be particularly undesirable. Image-based analysis of a coupon or pattern attached to a component for strain information may also require a field of view sufficient to capture the entire coupon or pattern. In situ rotating components may be difficult to capture in a single image.

SUMMARY

A first aspect of this disclosure provides a system for visual creep inspection of rotating components. A component has an external surface and an axis of rotation. The external surface has a circumference and a plurality of three dimensional reference marks forming a reference pattern along the circumference. An optical data capture device generates a data signal based on the plurality of three dimensional reference marks. A data analysis system processes the data signal to calculate a deviation in spacing of the reference pattern along the circumference and determining a strain measurement.

A second aspect of the disclosure provides a rotating component for visual creep inspection. A component body has an external surface and an axis of rotation. The external surface has a circumference. A plurality of three dimensional reference marks form a reference pattern along the circumference and having a mark height from the external surface.

A third aspect of the disclosure provides a method of visual creep inspection of a rotating component. A component with an external surface and an axis of rotation is rotated. The external surface has a circumference and a plurality of three dimensional reference marks forming a reference pattern along the circumference. A data signal is generated based on the plurality of three dimensional reference marks. A deviation in spacing of the reference pattern along the circumference is calculated using the data signal. A strain measurement is determined.

The illustrative aspects of the present disclosure are arranged to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
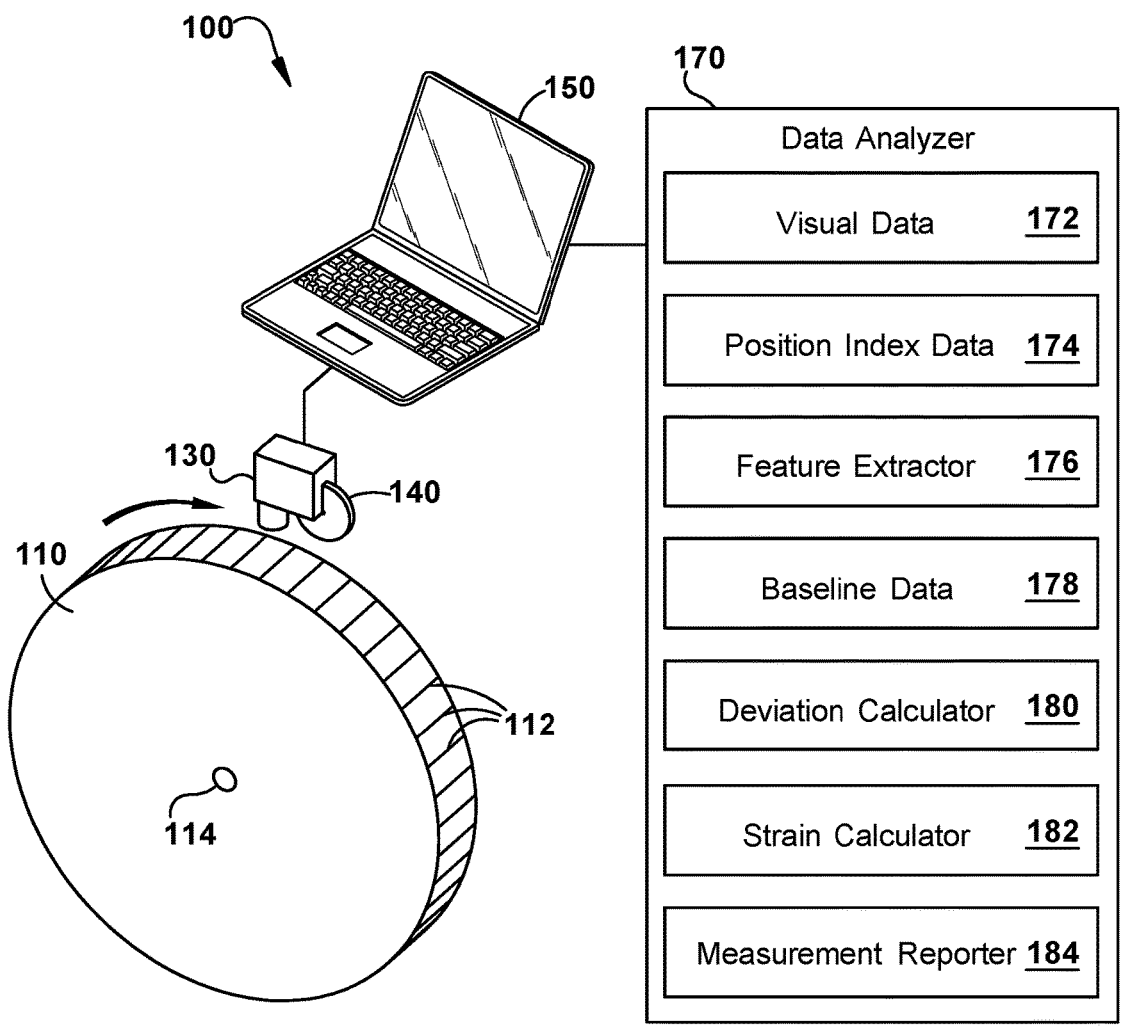
FIG. 1 shows a diagram of an example system for visual creep inspection of rotating components according to various embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely illustrative.

Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Referring to FIG. 1, an example system 100 for visual creep inspection of a rotating component 110 is depicted. Component 110 includes a plurality of reference marks 112. In some embodiments, component 110 may be a rotating component, such as a rotor, shaft, wheel, shroud, or stage of airfoils, in a gas turbine. A visual data capture device 130 is positioned relative to component 110 to generate visual data based on reference marks 112 and communicate that visual data to computing system 150. In some embodiments, a position index encoder 140 may provide position index data to computing system 150 as well. Computing system 150 includes or provides access to a data analyzer 170. Data analyzer 170 may use the visual data and, in some embodiments, the position index data to calculate strain values for component 110. These strain values and the supporting data and calculations may be made available to a user of computing system 150 or shared electronically with other systems and users, including use by a computer-based maintenance or more general plant management system. The strain values may assist in quantifying local and global strain on component 110 to describe component creep and provide actionable data for operations and maintenance decisions relevant to the system using component 110.

Component 110 may have a generally circular cross-section perpendicular to its axis of rotation 114 and an exterior surface 116 generally parallel to axis of rotation 114. Exterior surface 116 may define a circumference around the exterior of component 110. Exterior surface 116 may include reference marks 112 that are three dimensional reference marks. Three dimensional reference marks may be additive features on exterior surface 116 that include a length and width in the plane of exterior surface and a non-zero height projecting perpendicular to exterior surface 116. The height of three dimensional reference marks may generally be determined by the projection necessary for the feature not to be lost or substantially distorted by dirt, debris, and other contaminants that may accumulate on the surfaces of components inside a machine. For example, three dimensional reference marks may have a depth in the range of 0.005" to 0.020", such as 0.010" by surface peening, or a height in the range of 0.005" or greater, such as 0.010" by surface deposition. While some embodiments may use reference marks that are subtractive features, such as grooves or shaped blind depressions, in exterior surface 116, subtractive features may be more prone to obfuscation by surface debris and exterior surface 116 may better tolerate additive features of greater than 0.010" with improved visibility. In some embodiments, reference marks 112 are regularly spaced and discontinuous three dimensional features, such as line features running in an axial direction at regular intervals around the circumference of exterior surface 116. Other example features may include circles or dots, blocks, square frames, crosses, or more complex yet discrete shapes. In some embodiments, reference marks 112 are connected by continuous features, while still providing periodic reference points. For example, reference marks 112 may include a plurality of line features running in the axial direction interconnected by one or more line features running circumferentially to form a ladder or grid pattern around the circumference of exterior surface 116. The size and shapes of reference marks 112, whether continuous or discontinuous, along with their positions and spacings may constitute a reference pattern for component 110 or a portion thereof.

Visual data capture device 130 may include a variety image sensors, generally coupled with one or more controlled light sources, that may be used for precisely gathering visual data relative to positioning information. For example, visual data capture device 130 may include an optical coordinate measurement machine, a structured light profilometer, a laser profilometer, or a borescope camera (with light sources and phase measurement). In some embodiments, visual data capture device 130 may have sufficient resolution from its operating position to measure surface features with thousandths of an inch precision. Visual data capture device 130 may include an image sensors, analog/digital converters, and other data processing for generating visual data descriptive of at least one revolution of component 110. For example, visual data capture device 130 may collect an array of data elements representing distinct positions on exterior surface 116 and provide them as a data stream or data file for further digital analysis. In another example, visual data capture device 130 may generate analog signal data representing sensed light over time that may be accurately mapped to position based on either a known anchor reference mark and rate of rotation, or synchronization with position index data, such as the data from position index encoder 140. In some embodiments, position index encoder 140 provides position index data to assist with analysis of the visual data and accurately map visual information to the physical structure of component 110. In some embodiments, position index encoder 140 is built into the machine in which component 110 operates, such as a shaft encoder. In some embodiments, position index encoder 140 is an additional component specifically associated with system 100. For example, position index encoder 140 may include a rotary (gear) encoder that may be synchronized with the rotation of component 110 to provide positioning data to visual data capture device 130.

Computing system 150 may provide computing resources (memory, processing, and I/O) for processing visual data and position index data to generate strain data for component 110. In some embodiments, computing system 150 is a general purpose computing devices, such as a personal computer, work station, mobile device, or an embedded system in an industrial control or measurement system (using general purpose computing components and operating systems). In some embodiments, computing system 150 may be a specialized data processing system for the task of analyzing visual data and may be directly integrated with visual data capture device 130. In some embodiments, computing system 150 implements data analyzer 170 as computer program code and may include computer program code for other functions as well, including the control of visual data capture device 130. Computing system 150 may include at least one memory, processor, and input/output (I/O) interface interconnected by a bus. Further, computing system 150 may include communication with external I/O device/resources and/or storage systems, including connected system, such as visual data capture device 130, and network resources. In general, a processor executes computer program code, such as data analyzer 170, that is stored in memory and/or a storage system. While executing computer program code, the processor can read and/or write data to/from memory, storage systems, and I/O devices. The bus provides a communication link between each of the components within computing system 150. I/O devices may comprise any device that enables a user to interact with computing system 150 (e.g., keyboard, pointing device, display, etc.). Computing system 150 is only representative of various possible combinations of hardware and software. For example, the processor may comprise a single processing unit, or be distributed across one or more processing units in one or more locations, e.g., on a client and server. Similarly, memory and/or storage systems may reside at one or more physical locations. Memory and/or storage systems can comprise any combination of various types of non-transitory computer readable storage medium including magnetic media, optical media, random access memory (RAM), read only memory (ROM), etc. In some embodiments, computing system 150 is a laptop computer in communication with visual data capture device 130 via a wired (serial, USB, Ethernet, etc.) or wireless (802.11, Bluetooth, etc.) connection and running application software for data analyzer 170.

Data analyzer 170 may provide data, logic, and user interface for calculating strain around the circumference of component 110. Data analyzer 170 may receive or otherwise be in communication with visual data 172 and position index data 174. In some embodiments, position index data 174 may be calculated from visual data 172 based on an anchor reference mark that is uniquely discernable from among the plurality of reference marks 112. For example, an anchor reference mark may include a reference mark with a unique size, shape, spacing, or position relative to other reference marks that makes it identifiable within data analyzer 170 and from which visual data 172 may be accurately mapped to external surface 116. In some embodiments, visual data 172 may come from visual data capture device 130 and position index data 174 may come from position index encoder 140. Feature extractor 176 may process visual data 172 and position index data 174 to extract features related to the positions of reference marks 112. For example, feature extractor 176 may identify reference marks 112 based on algorithms for identifying changes or patterns in visual data 172 at specific positions or feature counts along the visual data stream or array and convert the series of positions into an ordered set of spacings between detected features. In some embodiments, feature extractor 176 may convert or express the position information as an ordered set of arc lengths along the circumference of component 110. In some embodiments, reference pattern marks 112 may include shapes (e.g., rectangles) with detectable width and length dimensions and feature extraction may include multiple values for each feature and/or calculated feature values such as the aspect ratio (width:length) of a rectangle. Baseline data 178 may be a set of extracted features based on reference marks 112 from an earlier time point to form the basis of a creep or strain calculation. In some embodiments, baseline data 178 may be an ordered set of arc lengths along the circumference of component 110 that correlate on an element-by-element basis to the set of arc lengths from feature extractor and being analyzed by data analyzer 170. For example, baseline data 178 may be the set of features measured prior to placing the equipment containing component 110 into service and/or the set of features from an earlier inspection, maintenance, or service call to take a baseline measurement. In some embodiments, a baseline data set based on the specifications of component 110 may also be available and used for calculation of variations between the component as specified, as manufactured, and/or as installed for strain values. In some embodiments, baseline data 178 may include a plurality of data sets for different time points to enable measurement of strain changes over time or operating life. Data from feature extractor 176 may be added to baseline data 178 for use in future strain calculations. Deviation calculator 180 may calculate the difference between baseline data 178 and the data from feature extractor 176. For example, deviation calculator 180 may calculate deviations in spacing around the circumference of component 110. In some embodiments, deviation values may be reported directly as quantifications of creep or distortion at various points around the circumference of component 110. Strain calculator 182 may calculate the ratio between baseline data 178 and the most recent data from feature extractor 176. In some embodiments, strain may be expressed as a percentage change between a baseline value for each reference mark and the most recent value for the same reference mark. If the time or operating time between the baseline measurement and recent value is known, a strain rate may be calculated as well. Measurement reporter 184 makes extracted, baseline, and/or calculated values available to users through a user interface, such as the user interface of computing system 150, and/or through data transfer to other systems, including maintenance and/or plant management systems.

Figure 2:
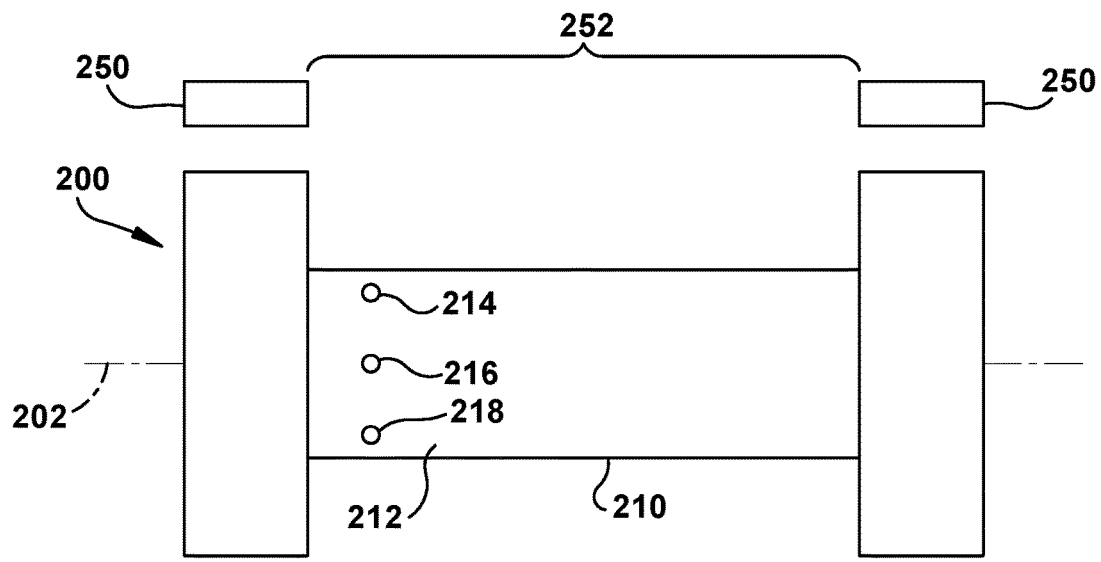
FIG. 2 shows a diagram of an example rotating component.

Referring to FIG. 2, an example simplified component 200 is shown in situ inside machine casing 250, where a system similar to system 100 may be used for visual creep inspection. A removable panel has been removed from machine casing 250 to provide an opening 252 enable clear, visual access to component 200 from at least one direction. In FIG. 2, component 200 is viewed from a direction perpendicular to axis of rotation 202, such as laterally or from above component 200 and the view shown may include cutaway of other components and/or sections of machine casing that would otherwise obscure component 200 from that view. Component 200 includes a component body 210 with an exterior surface 212. A series of discontinuous reference marks 214, 216, 218 are provided on exterior surface 212 at regular spacings. It should be noted that reference marks would continue around the circumference of component body 210. In some embodiments, reference marks 214, 216, 218 may be of identical configurations (size, shape, position, etc.) and a creep measurement system may require an independent anchor reference and/or rotational position index. A creep measurement system may have its visual data capture device positioned such that the field of view or measurement includes the axial position of reference marks 214, 216, 218 and they (and the complete series of reference marks around the circumference) will pass through the field when component 200 is rotated a full revolution.

Figure 3:
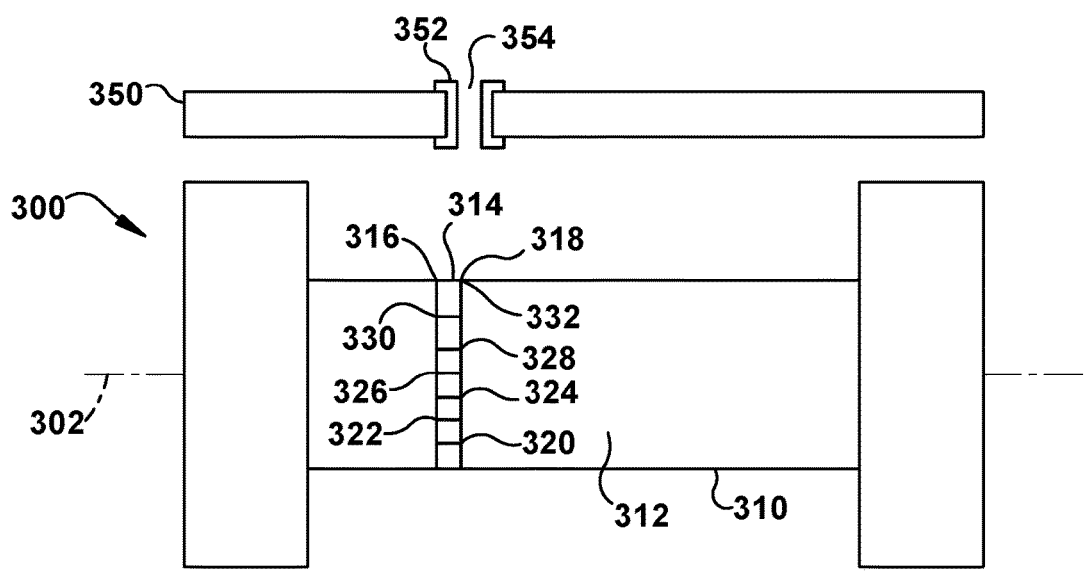
FIG. 3 shows a diagram of another example rotating component.

Referring to FIG. 3, another example simplified component 300 is shown in situ inside machine casing 350, where a system similar to system 100 may be used for visual creep inspection. A borescope port 352 in machine casing 350 provides an opening 355 enable entry of a visual data capture device or a portion thereof inside casing 350. For example, insertion of a borescope camera with light sources may provide clear, visual access to component 300 at an axial position proximate reference pattern 314. In FIG. 3, component 300 is viewed from a direction perpendicular to axis of rotation 302, such as laterally or from above component 300 and the view shown may include cutaway of other components and/or sections of machine casing that would otherwise obscure component 300 from that view. Component 300 may include a component body 310 with an exterior surface 312. A series of continuous reference marks may define reference pattern 314 on exterior surface 312. Reference pattern 314 may include spaced circumferential lines 316, 318 interconnecting perpendicular axial lines 320, 322, 324, 326, 328, 330, 332. It should be noted that reference pattern 314 would continue around the circumference of component body 310. In some embodiments, axial lines 320, 322, 324, 326, 328, 330, 332 may be of identical configurations (size, shape, position, etc.) and a creep measurement system may require an independent anchor reference and/or rotational position index. In the embodiment shown, axial line 330 is distinguishable from axial lines 320, 322, 324, 326, 328, 332 due to an increased thickness detectable in the visual data to act as an anchor reference and/or rotational position index. A creep measurement system may have its visual data capture device positioned through borescope port 352 such that the field of view or measurement includes the axial position of reference pattern 314 and the complete series of reference marks around the circumference will pass through the field when component 300 is rotated a full revolution.

Figure 4:
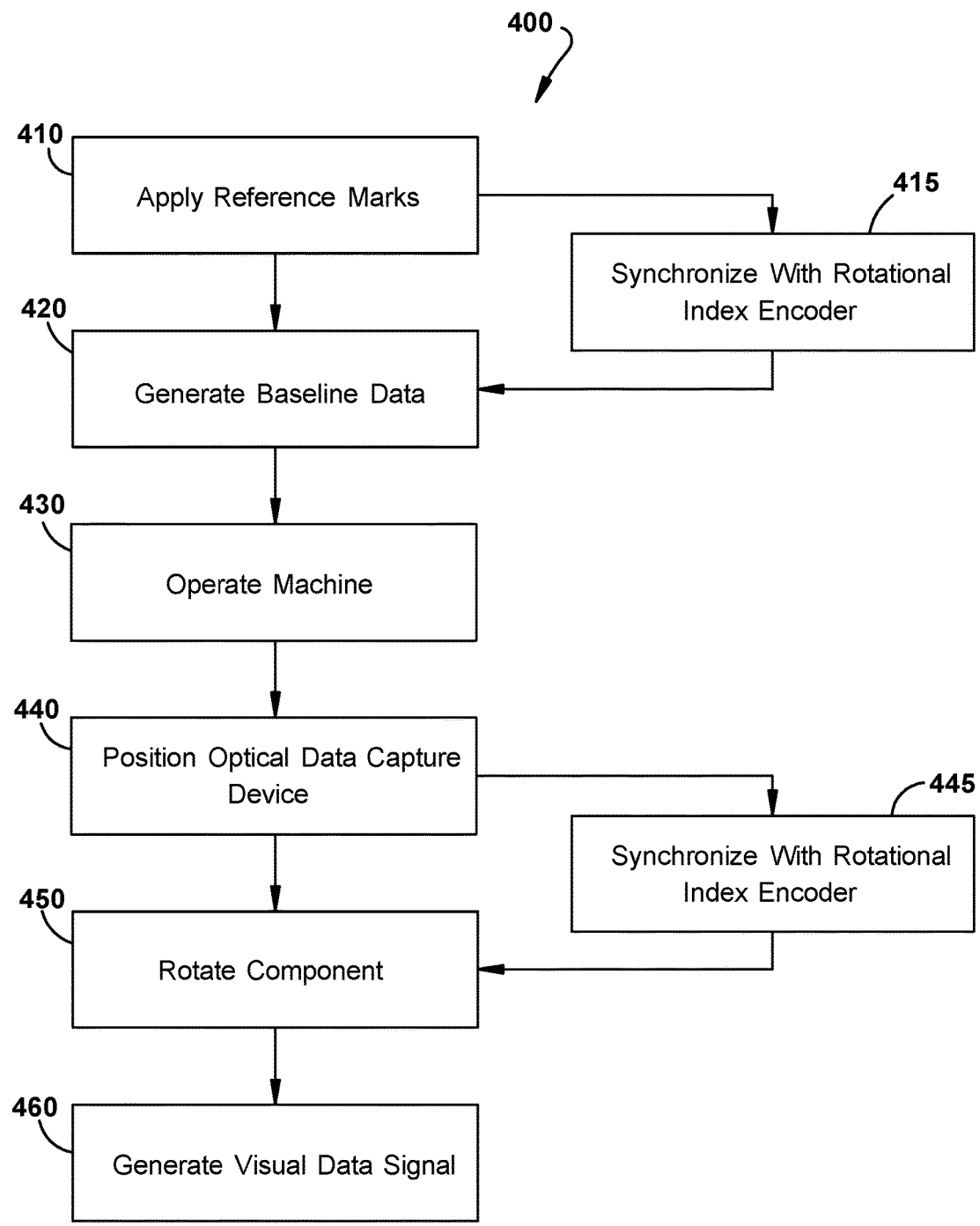
FIG. 4 shows an example method of generating visual data according to various embodiments of the disclosure.

Referring to FIG. 4, an example method 400 of generating visual data using a visual creep inspection system, such as system 100, is shown. In step 410, reference marks (see e.g., reference marks in FIGS. 1-3) are applied to a component to support future creep measurement. For example, reference marks may be applied around the circumference of a component during component manufacture before the component is installed in the machine, the reference marks may be applied once the component is partially or completely installed in the machine, or during later maintenance or service of the machine in situ or in a service center. In some embodiments, reference marks may be applied to the exterior surface of the component using an additive manufacturing method, such as electro spark deposition, laser welding, or mechanical dot peening. Because operating time and conditions between any baseline measurement and resulting creep or strain measurement may result in significant wear or corrosion on the component surface, permanent or semi-permanent reference marks made of resilient materials (generally metal) and compatible with bond coat used on the component should be used. In some embodiments, cold spray or spot cured (laser) ceramics may also be used for reference marks. Reference marks may generally be applied in a highly specific location with precision to thousandths of an inch. Selection of the axial location and configuration of reference marks may be based on thermal models, stress models, and/or field data for the actual or similar components or machines. In step 415, the positions of the reference marks may be synchronized with a rotational index encoder during application of the reference marks and/or separately after application of the reference marks to support measurement of baseline data. For example, a rotational index encoder (independent or integrated into the machine or manufacturing fixture) may be synchronized with the additive manufacturing tool and/or device used for generating baseline data. In step 420, baseline data is generated from the reference marks on the component. For example, a visual creep inspection system may be used to take and store a baseline measurement of the reference marks around the circumference of the component. In some embodiments, an alternate system may be used for taking the baseline measurement, such as a measurement system integrated with the manufacturing technology or an alternate measurement technology available in the manufacturing, testing, or assembly process, including non-visual methods such as contact-based CMM. In step 430, the machine including the component is operated over a period of time after the baseline measurement has been taken. For example, a machine, such as a gas turbine, may be put into service in a power plant and operate on a duty cycle appropriate to the machine and demands of the power plant. Periodically or based upon an event, the machine or component may be scheduled for inspection, maintenance, or service and there may be a desire to take a creep or strain measurement for the component. In step 440, an optical data capture device is positioned such that it has line of site to an axial position that includes the reference marks. For example, a high fidelity, high resolution optical data capture device integrated into a borescope may be inserted through a borescope port, the machine casing or a portion of the machine casing may be removed to provide visual access to the component, the entire rotor assembly may be removed from the machine and placed where it can be viewed, or the component may be entirely removed from its associated machine components and placed in a fixture for rotating the component in association with the optical data capture device. In step 445, rotation of the component may be synchronized with a rotational index encoder and the rotational index data may be used by the optical data capture device or in conjunction with the optical data generated. In step 450, the component is rotated such that the entire reference pattern (series of reference marks around the circumference of the component) passes the optical data capture device. For example, the component may be rotated within the machine or in a separate fixture for at least one complete revolution. In step 460, a visual data signal is generated by the optical data capture device representing the reference pattern around the circumference of the component. For example, the optical data capture device may generate an analog or digital data signal that can be processed and/or stored for extracting features and mapping them to positions around the circumference of the component. This optical data may be provided to or accessed by a data analyzer, such as data analysis software running on a computing device.

Figure 5:
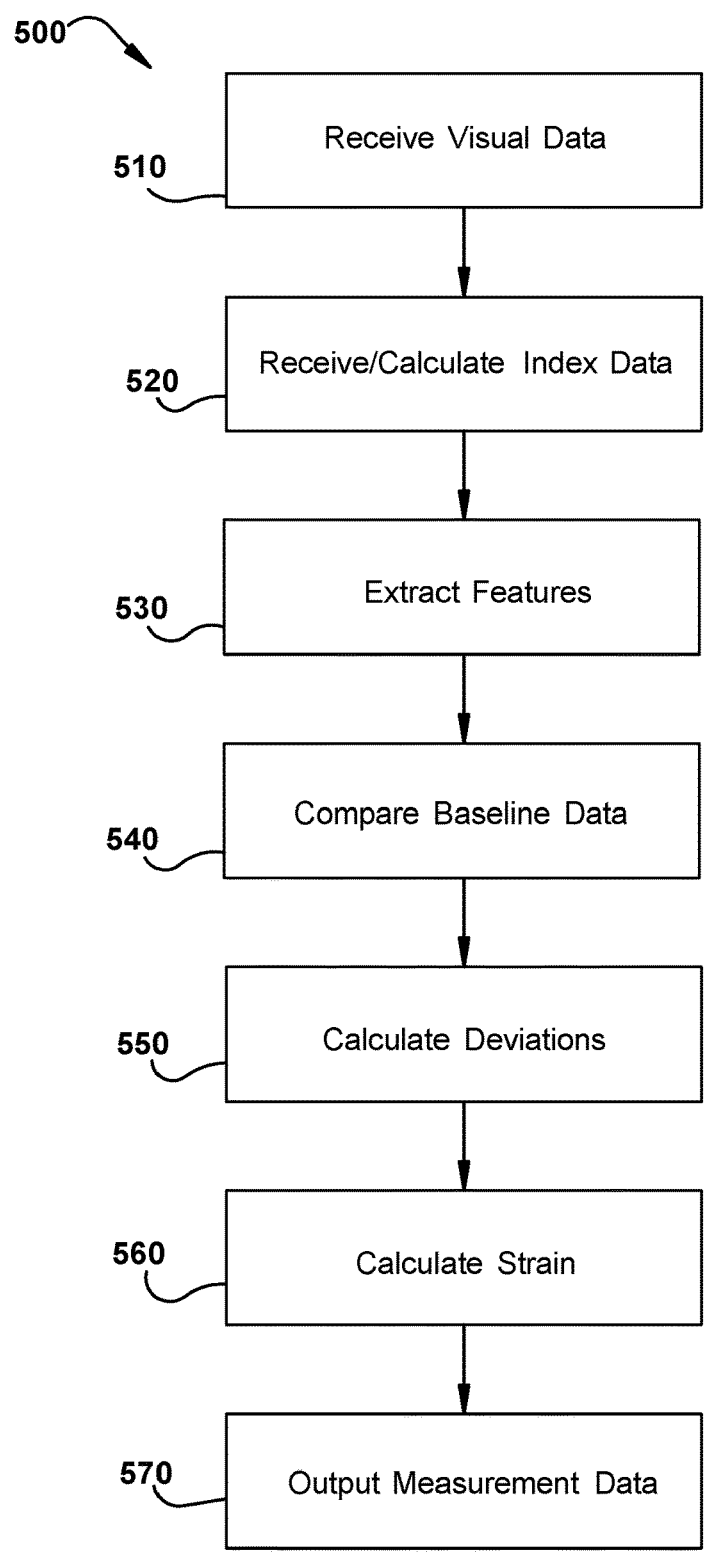
FIG. 5 shows an example method of processing visual data to calculate strain according to various embodiments of the disclosure.

Referring to FIG. 5, an example method 500 of processing visual data to calculate strain using a visual creep inspection system, such as system 100, is shown. In step 510, visual information is received for processing. For example, it may be a data signal sent to a data analyzer, the data analyzer may also provide controls for the optical data capture device, or the visual data may be retrieved from data storage. In step 520, position index data may be received or calculated. For example, position index data may be received as a data signal from the optical data capture device or a position index encoder or retrieved from data storage. In some embodiments, position index data may be calculated from the visual data based on an anchor reference mark that is uniquely discernable from among the reference marks. In step 530, visual data and position index data may be processed to extract features related to the positions of the reference marks. For example, the count and position of reference marks may be identified based on algorithms for identifying changes or patterns in visual data sequentially along the visual data stream or array and convert the series of positions into an ordered set of spacings between detected features. In some embodiments, the position information may be converted or expressed as an ordered set of arc lengths along the circumference of the component. In some embodiments, reference marks may include shapes (e.g., rectangles) with detectable width and length dimensions and feature extraction may include multiple values for each feature and/or calculated feature values such as the aspect ratio (width:length) of a rectangle. In step 540, baseline data is retrieved from data storage. For example, the baseline measurements between reference marks generated at an earlier time point may be retrieved from a data repository of component-related data. In step 550, the difference between baseline data and the extracted feature data based on the current positions of the reference marks may be calculated. For example, deviations in spacing around the circumference of the component may be calculated. In step 560, the ratio between spacings in the baseline data and spacings in the extracted feature data may be calculated to quantify strain. For example, strain may be expressed as a percentage change between a baseline spacing value for each reference mark and the most recent spacing value for the same reference mark. In step 570, extracted, baseline, and/or calculated values are output through a user interface, such as the user interface of a computing system and/or through data transfer to other systems, including maintenance and/or plant management systems. This data output may be used for service, maintenance, and operations decisions related to the component and the machine in which it operates, including replacement or repair of the component.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A system comprising:
   a component with an external surface and an axis of rotation, wherein the external surface has a circumference and a plurality of three dimensional reference marks forming a reference pattern along the circumference;
   an optical data capture device that transmits a data signal based on the plurality of three dimensional reference marks;
   a rotational index encoder that generates position data related to the plurality of three dimensional reference marks as the component rotates around the axis of rotation; and
   a data analysis system that processes the data signal transmitted from the optical data capture device and the position data generated by the rotational index encoder to calculate a deviation in spacing of the reference pattern along the circumference and determine a strain measurement.

2. The system of claim 1, wherein the reference pattern is selected from regularly spaced and discontinuous three dimensional reference marks along the circumference, or a ladder pattern including a plurality of reference lines parallel to the circumference and a plurality of reference lines perpendicular to the circumference.

3. The system of claim 1, wherein the reference pattern includes an anchor mark at a single circumferential position and the plurality of three dimensional reference marks each have a count from the anchor mark for use by the data analysis system.

4. The system of claim 1, wherein the plurality of three dimensional reference marks have a mark height measured from the external surface and are added to the external surface by a process selected from electro spark deposition, laser welding, or mechanical dot peening.

5. The system of claim 1, wherein the optical data capture device is selected from an optical coordinate measurement machine, a structured light profilometer, a laser profilometer, or a borescope camera.

6. The system of claim 1, wherein the data analysis system extracts an ordered set of spacing values among the plurality of three dimensional reference marks and converts the ordered set of spacing values to arc lengths along the circumference to calculate the deviation in spacing based on a reference set of spacing values.

7. A method comprising:
   rotating a component with an external surface and an axis of rotation, wherein the external surface has a circumference and a plurality of three dimensional reference marks forming a reference pattern along the circumference;
   generating a data signal based on the plurality of three dimensional reference marks;
   generating position data related to the plurality of three dimensional reference marks as the component rotates around the axis of rotation using a rotational index encoder;
   calculating a deviation in spacing of the reference pattern along the circumference using the data signal and the position data; and
   determining a strain measurement.

8. The method of claim 7, wherein the reference pattern is selected from regularly spaced and discontinuous three dimensional reference marks along the circumference, or a ladder pattern including a plurality of reference lines parallel to the circumference and a plurality of reference lines perpendicular to the circumference.

9. The method of claim 7, wherein the reference pattern includes an anchor mark at a single circumferential position and the plurality of three dimensional reference marks each have a count from the anchor mark for use in calculating the deviation in spacing.

10. The method of claim 7, further comprising applying the plurality of three dimensional reference marks to the external surface by a process selected from electro spark deposition, laser welding, or mechanical dot peening.

11. The method of claim 7, further comprising inserting an optical data capture device through a borescope port for generating the data signal, wherein the component is enclosed within a gas turbine casing.

12. The method of claim 7, wherein calculating the deviation in spacing includes extracting an ordered set of spacing values among the plurality of three dimensional reference marks and converting the ordered set of spacing values to arc lengths along the circumference to calculate the deviation in spacing based on a reference set of spacing values.

* * * * *